(12) United States Patent
Bartell et al.

(10) Patent No.: US 7,656,406 B1
(45) Date of Patent: Feb. 2, 2010

(54) REPRESENTING AND ANIMATING PAINT STROKES (75) Inventors: Jason Bartell, Boulder, CO (US);
Daniel M. Wilk, Seattle, WA (US);
James Acquavella, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 936 days.

(21) Appl. No.: 10/696,740

(22) Filed: Oct. 28, 2003

(51) Int. Cl.
*G06T 11/20* (2006.01)
*G09G 5/00* (2006.01)
*G09G 5/26* (2006.01)
*G06T 13/00* (2006.01)
*G06T 15/70* (2006.01)

(52) U.S. Cl. .................... 345/441; 345/581; 345/472.3; 345/473

(58) Field of Classification Search ................. 345/582, 345/473–475, 441, 467–472.3, 581
See application file for complete search history.

(56) References Cited

U.S. PATENT DOCUMENTS

| | | | |
|---|---|---|---|
| 5,155,813 A * | 10/1992 | Donoghue et al. .......... 345/179 |
| 5,835,086 A * | 11/1998 | Bradstreet et al. ........... 345/581 |
| 6,115,051 A | 9/2000 | Simons et al. .............. 345/442 |
| 6,195,100 B1 * | 2/2001 | Tibbett ....................... 345/581 |
| 6,268,865 B1 * | 7/2001 | Daniels et al. .............. 345/582 |
| 6,348,924 B1 * | 2/2002 | Brinsmead .................. 345/441 |
| 7,158,138 B1 * | 1/2007 | Bronskill et al. ............ 345/441 |
| 7,170,523 B2 * | 1/2007 | Suzuki ....................... 345/581 |

OTHER PUBLICATIONS

"Adobe After Effects Help: Stylized Effects", Adobe Systems Incorporated, Sep. 2003, pp. 217-218.
Acquavella, "Text Modification" U.S. Appl. No. 10/382,663, filed Mar. 5, 2003, 27 pages.

* cited by examiner

*Primary Examiner*—Ryan R Yang
(74) *Attorney, Agent, or Firm*—Fish & Richardson P.C.

(57) ABSTRACT

Techniques for representing a stroke in an image, the stroke being defined by a path extending across one or more positions in the image and one or more stroke parameters, each stroke parameter representing an appearance attribute of the stroke. The techniques include associating values for the one or more stroke parameters with time values in a time dimension of the stroke, the parameter values being associated with the time values independent of position along the stroke path; and representing the stroke according to the parameter values and their associated time values.

27 Claims, 4 Drawing Sheets

| STROKE THICKNESS VALUES | |
|---|---|
| 0 | 0 |
| 0.03030303 | 7.57889 |
| 0.060606061 | 10.8216 |
| 0.090909091 | 12.2654 |
| 0.121212121 | 12.9649 |
| 0.151515152 | 13.2353 |
| 0.181818182 | 13.2268 |
| 0.212121212 | 12.9178 |
| 0.242424242 | 12.1544 |
| 0.272727273 | 10.5887 |
| 0.303030303 | 7.01988 |
| 0.333333333 | 0 |
| 0.363636364 | 7.57889 |
| 0.393939394 | 10.8216 |
| 0.424242424 | 12.2654 |
| 0.454545455 | 12.9649 |
| 0.484848485 | 13.2353 |
| 0.515151515 | 13.2268 |
| 0.545454545 | 12.9178 |
| 0.575757576 | 12.1544 |
| 0.606060606 | 10.5887 |
| 0.636363636 | 7.01988 |
| 0.666666667 | 0 |
| 0.696969697 | 7.57889 |
| 0.727272727 | 10.8216 |
| 0.757575758 | 12.2654 |
| 0.787878788 | 12.9649 |
| 0.818181818 | 13.2353 |
| 0.848484848 | 13.2268 |
| 0.878787879 | 12.9178 |
| 0.909090909 | 12.1544 |
| 0.939393939 | 10.5887 |
| 0.96969697 | 7.01988 |
| 1 | 0 |
| 1.03030303 | 7.57889 |
| 1.060606061 | 10.8216 |
| 1.090909091 | 12.2654 |
| 1.121212121 | 12.9649 |
| 1.151515152 | 13.2353 |
| 1.181818182 | 13.2268 |
| 1.212121212 | 12.9178 |
| 1.242424242 | 12.1544 |
| 1.272727273 | 10.5887 |
| 1.303030303 | 7.01988 |
| 1.333333333 | 0 |
| 1.363636364 | 7.57889 |
| 1.393939394 | 10.8216 |
| 1.424242424 | 12.2654 |
| 1.454545455 | 12.9649 |
| 1.484848485 | 13.2353 |
| 1.515151515 | 13.2268 |
| 1.545454545 | 12.9178 |
| 1.575757576 | 12.1544 |
| 1.606060606 | 10.5887 |
| 1.636363636 | 7.01988 |
| 1.666666667 | 0 |
| 1.696969697 | 7.57889 |
| 1.727272727 | 10.8216 |
| 1.757575758 | 12.2654 |
| 1.787878788 | 12.9649 |
| 1.818181818 | 13.2353 |
| 1.848484848 | 13.2268 |
| 1.878787879 | 12.9178 |
| 1.909090909 | 12.1544 |
| 1.939393939 | 10.5887 |
| 1.96969697 | 7.01988 |
| 2 | 0 |

REPRESENTING AND ANIMATING PAINT STROKES

BACKGROUND OF THE INVENTION

The present invention relates to representing and animating paint strokes.

A paint stroke is defined in two dimensions: position and time. In the position dimension, the stroke is defined by a stroke path that extends from a start position to an end position. In the time dimension, the stroke is defined by a timing that reflects the actual time it takes to draw or compose the stroke. This timing will be referred to as composition time.

The appearance of the paint stroke is defined by values for one or more stroke parameters. Stroke parameters can include, for example, thickness, feather, and hardness. The values for the stroke parameters can vary along the stroke path. For example, a stroke thickness parameter can have a smaller value at a first position along the stroke path and a larger value at a second position further along the stroke path; these values can be used to define a stroke that becomes thicker between the first and second positions along the stroke path.

In this specification, animating a paint stroke refers to displaying the paint stroke such that its appearance changes over time. This effect can be produced by creating multiple instances of the paint stroke, each instance corresponding to a different appearance of the stroke, and then displaying each instance one after another in time. The timing of when each instance is displayed will be referred to as the animation time.

SUMMARY OF THE INVENTION

In general, in one aspect, the present invention provides methods and apparatus, including computer program products, implementing techniques for representing a stroke in an image, the stroke being defined by a path extending across one or more positions in the image and one or more stroke parameters, each stroke parameter representing an appearance attribute of the stroke. The techniques include associating values for the one or more stroke parameters with time values in a time dimension of the stroke, the parameter values being associated with the time values independent of position along the stroke path; and representing the stroke according to the parameter values and their associated time values.

Advantageous implementations of the invention include one or more of the following features. The parameter values and positions are independently associated with time values in the time dimension of the stroke. The association of parameter values with time values is defined as a function. The function is piecewise linear. A different function is used for each parameter. The function is implemented as a table.

The operations further comprise changing the time value associated with a parameter value; and representing the stroke based in part on the parameter value and the associated changed time value. Representing the stroke according to the parameter values and their associated time values includes representing a first instance of the stroke and representing the stroke based in part on the parameter and the associated changed time value includes presenting a second instance of the stroke. The operations further comprise interpolating between the first and second instances to generate one or more additional instances of the stroke. The first instance and the second instance each correspond to a keyframe of an animation, the animation having an animation time frame, each keyframe corresponding to a time point in animation time; the time value in the time dimension of the stroke is changed as a function of animation time. In the first instance or the second instance of the stroke, not every parameter has a defined value.

The invention can be implemented to realize one or more of the following advantages. Defining parameters as a function of composition time of the stroke instead of position makes it possible to animate parameters at a single location on the stroke. Independently defining each parameter as a function of time makes it possible to animate individual parameters separate from other parameters. The amount of space required to store the stroke parameters can be reduced. The processing time required to render the paint stroke can be reduced. The parameters of the paint stroke can be animated. The appearance of the paint stroke can be changed, for example, to correct aspects of the appearance without recreating the entire stroke.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
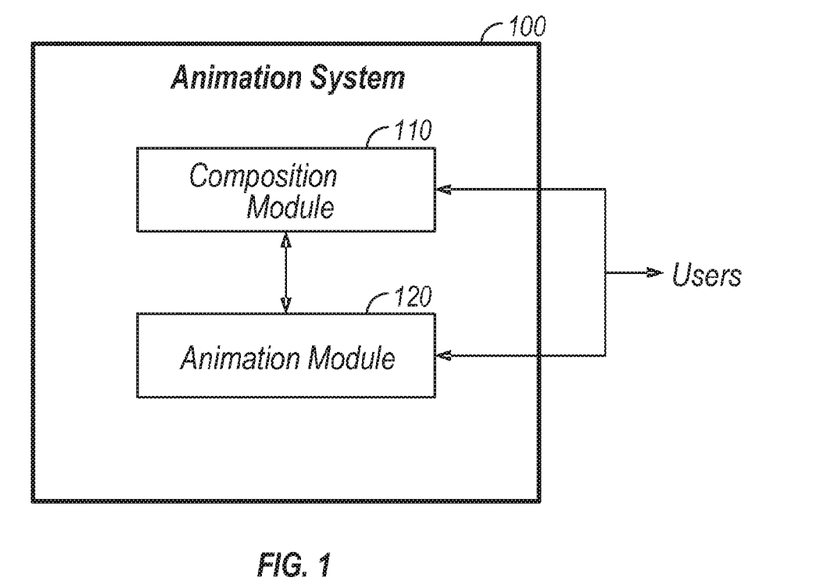
FIG. 1 is a block diagram of a system in accordance with the invention.

As shown in FIG. 1 a system 100 in accordance with the invention includes a composition module 110 for composing paint strokes and an animation module 120 for animating composed paint strokes. The modules 110, 120 can be implemented separately or combined into a single module. The system 100 can be a stand-alone system or a component within a larger system such as a video editing system. One such video editing system is Adobe After Effects, available from Adobe Systems of San Jose, Calif.

Composition

The composition module 110 composes paint strokes and stores data representing the composed paint strokes for later use by the composition module 110 or by other modules, for example, the animation module 120.

Figure 2:
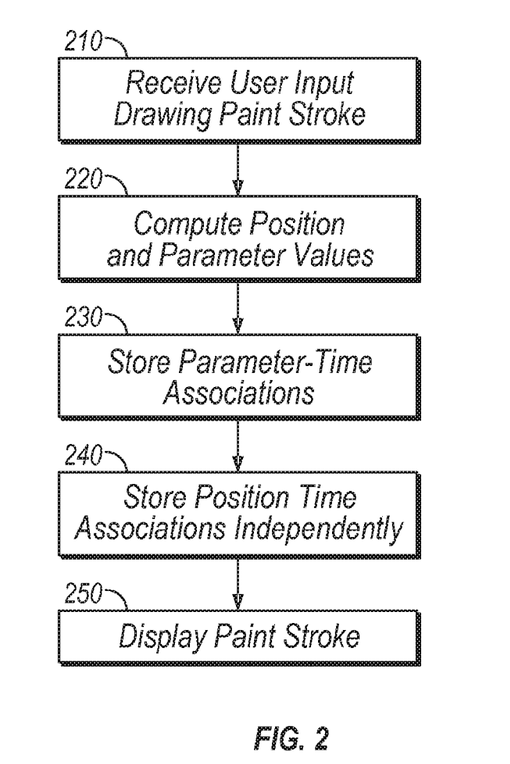
FIG. 2 is a flow diagram of a method in accordance with the invention.

In operation, as illustrated by method 200 of FIG. 2, the composition module 110 receives user input drawing a paint stroke (step 210). The user input can be received through an input device such as a keyboard, mouse or a stylus applied to a tablet. Alternatively, the composition module 110 can generate a stroke programmatically, for example, based on a function.

The composition module 110 computes position values for the stroke path and parameter values for the stroke parameters based on the received user input (step 220). The position values can be computed based on data received from the input device (e.g., coordinates recorded by a mouse or tablet). The parameter values can also be computed based on data received from the input device (e.g., stylus pressure values, stylus tilt values, and stylus airbrush wheel values). In computing the parameter values, the composition module 110 uses information received from the user that maps between data values and parameter values. The mapping information can specify, for example, that the stylus pressure values be mapped to the stroke thickness values.

Alternatively, one or more of the parameter or position values can be computed without user input. For example, position values can be generated by the composition module 110 using an image analysis algorithm, for example, an edge tracing algorithm. The stroke thickness values can be computer-generated, for example, based on measuring the darkness values of the image.

Figure 3:
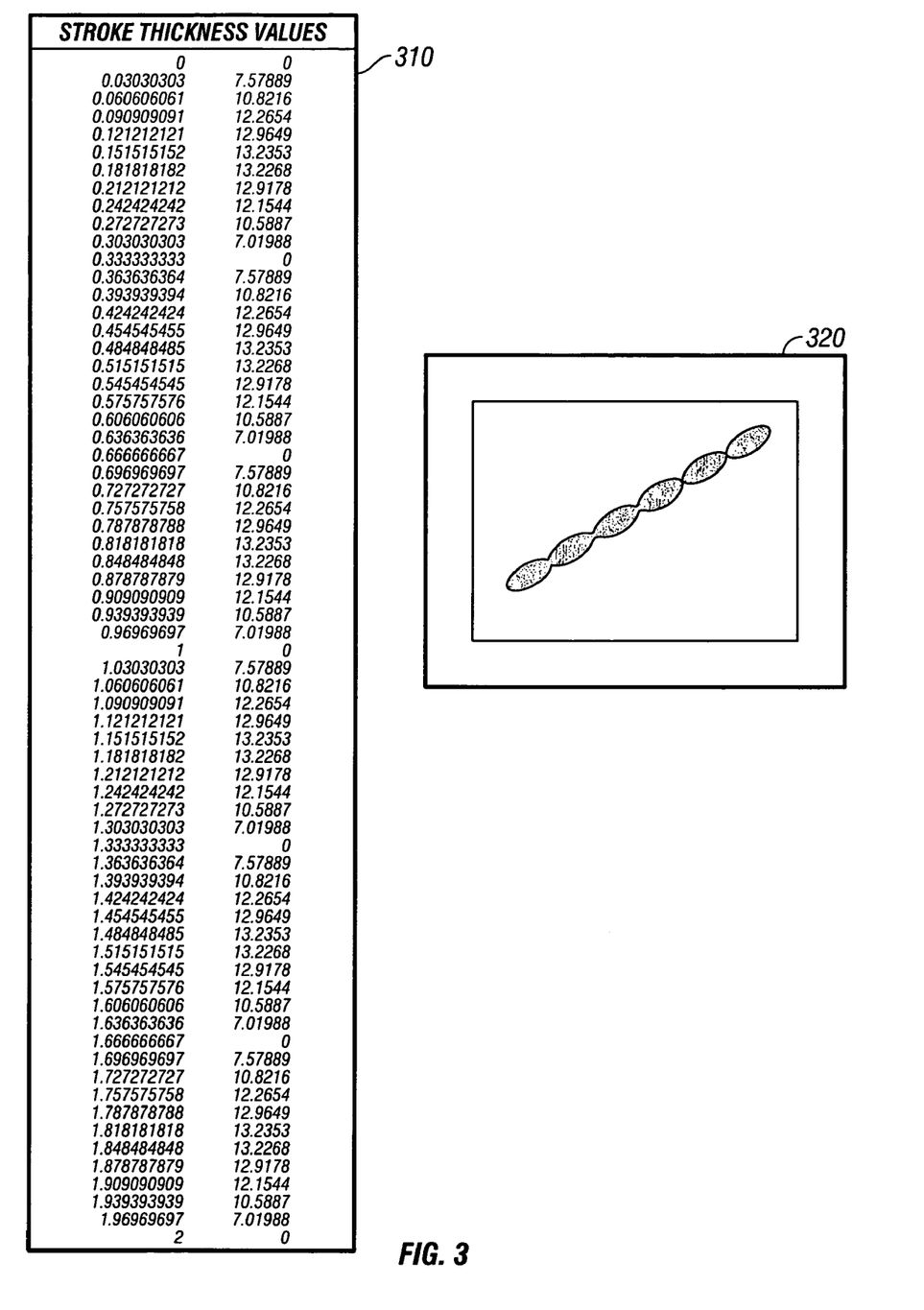
FIG. 3 is an example of a parameter-time table for a paint stroke.

The composition module 110 stores the computed parameter values as a function of composition time (step 230). The computed parameter values can be stored as a table of (time, value) associations. A separate table can be used for each parameter. FIG. 3 shows an example of a parameter-time table 310 that stores the thickness values for a paint stroke 320.

The composition module 110 also stores the computed position values as a function of composition time (step 240). The position values can be stored as distances along a sequence of Bezier segments and the position-time association can be stored as a table that maps time values to position values. The table values can represent function coefficients for functions that are piecewise linear.

The position-time associations can be stored independently of the parameter-time associations. This arrangement enables the parameter-time associations to be changed independently of the position-time associations. This arrangement also allows for storage of paint strokes that are stationary in the position dimension, but whose appearance changes in the time dimension (e.g., airbrush strokes).

The composition module 110 displays the composed paint stroke to the user (step 240). The paint stroke can be rendered on a display device such as a computer monitor. The paint stroke can be rendered as a collection of individual brush tip hits that are spaced closely together along the stroke path thereby creating the appearance of a continuous line. The rendering can involve iterating through the parameter-time tables and determining the parameter values at each composition time point. At a given composition time point, the position-time table is used to determine the location of the brush tip hit. The parameter values at time points intermediate to the stored time points can be generated by interpolating between the table entries.

One or more of the above-described steps can occur concurrently. For example, the paint stroke can be displayed as the user input is received, thereby enabling the user to view the stroke as it is being drawn. The position and parameter values can also be computed and stored as the user input is received.

Animation

The animation module 120 takes a composed paint stroke and animates the paint stroke so that its appearance changes over the course of the animation. In other words, the appearance of the paint stroke at a first animation time point can differ from the appearance of the paint stroke at a second animation time point.

Figure 4:
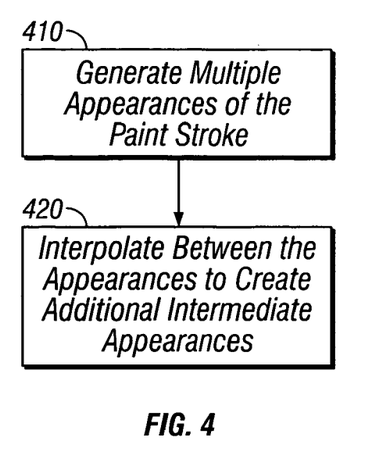
FIG. 4 is a flow diagram of a method in accordance with the invention.

In operation, as illustrated by method 400 of FIG. 4, the animation module 120 animates a paint stroke by generating multiple instances of the paint stroke (step 410). An instance of the paint stroke is a version of the paint stroke at a particular point in animation time. The version has a value defined for at least one parameter of the stroke, but every parameter need not have a value defined at that time point. The value of some of the parameters can be determined by interpolation.

A different instance of the paint stroke is generated by changing one or more composition time values associated with one or more stroke parameters as a function of animation time. In other words, each instance corresponds to a different point in animation time, and for each instance the animation module 120 changes one or more of the composition time values associated with one or more of the stroke parameters.

In one implementation, the composition time values are changed by applying a distortion function to each composition time value. An example of one such distortion function is.

$$\text{new\_time} = \text{total\_time} * (\text{original\_time}/\text{total\_time})^{(1.0 + distortion\_amount)}$$

As illustrated by this example, the distortion function takes as input the original composition time value along with a distortion amount and outputs a new composition time value. The distortion amount can be a user-specified value. The user can specify different distortion amounts to be applied at different animation time points. For example, at animation time point 0, the distortion amount can be 0%; at animation time point 1, the distortion amount can be 50%; and at animation time point 2, the distortion amount can be 100%. This results in an animation where, at the beginning of the animation, the paint stroke appears as originally composed, and then the appearance of the paint stroke becomes more and more distorted as the animation progresses.

Figure 5:
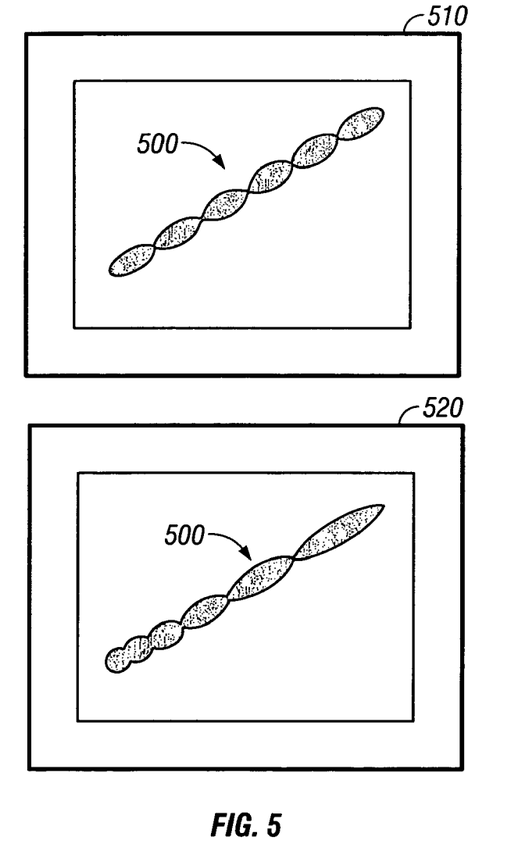
FIG. 5 is an example of two different appearances of a paint stroke.

FIG. 5 shows an example of two stroke instances 510, 520 that can be generated based on applying the above-illustrated distortion function to a paint stroke 500. The paint stroke 500 contains six bulges, swellings distributed along the length of the stroke path. The relative spacing of the bulges is determined by a bulge_spacing parameter. The two instances 510, 520 are generated by using the above-illustrated distortion function to manipulate the composition time values associated with the bulge_spacing parameter values for the paint stroke 500.

The first instance 510 of the paint stroke is the paint stroke 500 as originally drawn. The second instance 520 of the paint stroke 500 is the result of applying the distortion function with the distortion amount set to 100%. In the second instance 520, the spacing of the bulges have been distorted, causing the bulges to be crowded towards the left end of the stroke instead of being distributed evenly along the length of the stroke as in the first instance 510 of the stroke.

The animation module 120 interpolates between the first and second instances to generate one or more additional instances (step 420). The additional instances can represent intermediate stages of the transformation from the first instance 510 to the second instance 520. Various forms of interpolation can be used, including, for example, linear interpolation. Using linear interpolation saves space and processing time because the middle entry of three adjacent collinear table entries can be eliminated.

In one implementation, the animation module 120 animates the paint stroke by adding the paint stroke to a movie and then creates a separate keyframe for each different instance of the paint stroke, each keyframe representing a particular point in animation time.

Figure 6:
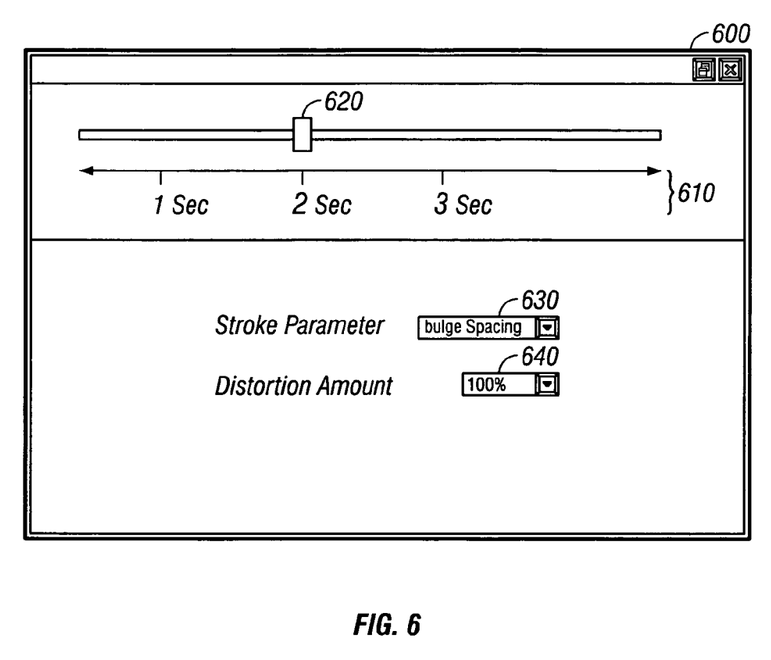
FIG. 6 is an example of a user interface in accordance with the invention.

The animation module 120 can create each keyframe based on user input provided through a user interface such as the user interface 600 of FIG. 6. The user interface 600 displays a timeline 610 that represents the timing of the animation sequence. Users can select an animation time point 620 (or keyframe) using a slider bar or other input mechanism (e.g., input field, menu). At the selected animation time point 620, users can specify a paint stroke parameter 630, and a distortion amount 640 to be applied to the specified stroke parameter at the specified animation time point. For example, based on the user input shown in FIG. 6, the animation module 120 can create a keyframe at animation time 2 seconds that corresponds to the instance of the paint stroke 500 where the bulge parameter is distorted 100% (e.g., the second instance 520 of the paint stroke 500).

As described above, a separate function can be used for each parameter. As a consequence, the parameters can be changed independently at different animation time points. For example, for a stroke having thickness and softness parameters, the thickness parameter can be changed between animation time points 1 and 3 so that the thickness of the paint stroke increases between time point 1 and 3. The softness parameter can also be changed, but between animation time points 2 and 4. In this example, the keyframe corresponding to the instance of the paint stroke at animation time point 3 would have a value defined for the thickness parameter, but the value for the softness parameter would not be defined by the keyframe; instead, it would be calculated by interpolating between the softness values defined at keyframes for animation time points 2 and 4.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results.

What is claimed is:

1. A computer-implemented method comprising:
obtaining a composed paint stroke, the composed paint stroke having a stroke path and an appearance attribute, the stroke path being defined by a position-time association, the position-time association being an association between a plurality of position values and a first plurality of time values in a time period, the appearance attribute being defined by a parameter-time association, the parameter-time association being an association between a plurality of parameter values for the appearance attribute and a second plurality of time values in the time period, the second plurality of time values being variable independently of the first plurality of time values;
generating a first instance of the composed paint stroke based on the position-time association and the parameter-time association as obtained, where an instance of the composed paint stroke is defined as a plurality of composition time values, and a position value and a parameter value for each of the composition time values, and the position value and the parameter value for each of the composition time values are determined according to the position-time association and the parameter-time association of the composed paint stroke;
changing the composed paint stroke by changing a time value in the second plurality of time values that is associated with a parameter value in the plurality of parameter values such that the parameter-time association as changed differs from the parameter-time association as obtained;
generating a second instance of the composed paint stroke based on the position-time association as obtained and the parameter-time association as changed; and
presenting the first instance and the second instance of the composed paint stroke on a display device in sequence such that the stroke path of the composed paint stroke remains stationary while the appearance attribute changes.

2. The method of claim 1, wherein, the association of parameter values with time values is defined as a function.

3. The method of claim 2, wherein:
the function is piecewise linear.

4. The method of claim 2, wherein:
a different function is used for each parameter value.

5. The method of claim 2, wherein:
the function is implemented as a table.

6. The method of claim 1, further comprising:
interpolating between the first and second instances to generate one or more additional instances of the composed paint stroke; and
presenting the one or more additional instances of the composed paint stroke on the display device in sequence between the first instance and the second instance of the composed paint stroke.

7. The method of claim 6, wherein:
the first instance and the second instance each corresponds to a keyframe of an animation, the animation having an animation time frame, each keyframe corresponding to a time point in animation time; and the time value is changed as a function of animation time.

8. The method of claim 7, where changing a time value in the second plurality of time values that is associated with a parameter value in the plurality of parameter values further comprises:

applying a distortion function to the time value, where the distortion function takes the time value and a distortion amount as inputs, and outputs a new time value to be associated with the parameter value in the plurality of parameter values.

9. The method of claim 1, where changing a time value in the second plurality of time values that is associated with a parameter value in the plurality of parameter values further comprises:

applying a distortion function to the time value, where the distortion function takes the time value and a distortion amount as inputs, and outputs a new time value to be associated with the parameter value in the plurality of parameter values.

10. A computer-readable medium having instructions stored thereon, which when executed by at least one processor, cause the processor to perform operations comprising:

obtaining a composed paint stroke, the composed paint stroke having a stroke path and an appearance attribute, the stroke path being defined by a position-time association, the position-time association being an association between a plurality of position values and a first plurality of time values in a time period, the appearance attribute being defined by a parameter-time association, the parameter-time association being an association between a plurality of parameter values for the appearance attribute and a second plurality of time values in the time period, the second plurality of time values being variable independently of the first plurality of time values, generating a first instance of the composed paint stroke based on the position-time association and the parameter-time association as obtained, where an instance of the composed paint stroke is defined as a plurality of composition time values, and a position value and a parameter value for each of the composition time values, and the position value and the parameter value for each of the composition time values are determined according to the position-time association and the parameter-time association of the composed paint stroke;

changing the composed paint stroke by changing a time value in the second plurality of time values that is associated with a parameter value in the plurality of parameter values such that the parameter-time association as changed differs from the parameter-time association as obtained;

generating a second instance of the composed paint stroke based on the position-time association as obtained and the parameter-time association as changed; and presenting the first instance and the second instance of the composed paint stroke on a display device in sequence such that the stroke path of the composed paint stroke remains stationary while the appearance attribute changes.

11. The computer-readable medium of claim 10, wherein, the association of parameter values with time values is defined as a function.

12. The computer-readable medium of claim 11, wherein: the function is piecewise linear.

13. The computer-readable medium of claim 11, wherein: a different function is used for each parameter value.

14. The computer-readable medium of claim 11, wherein: the function is implemented as a table.

15. The computer-readable medium of claim 10, wherein the operations further comprises:

interpolating between the first and second instances to generate one or more additional instances of the composed paint stroke; and presenting the one or more additional instances of the composed paint stroke on the display device in sequence between the first instance and the second instance of the composed paint stroke.

16. The computer-readable medium of claim 15, wherein: the first instance and the second instance each corresponds to a keyframe of an animation, the animation having an animation time frame, each keyframe corresponding to a time point in animation time; and the time value is changed as a function of animation time.

17. The computer-readable medium of claim 16, where changing a time value in the second plurality of time values that is associated with a parameter value in the plurality of parameter values further comprises:

applying a distortion function to the time value, where the distortion function takes the time value and a distortion amount as inputs, and outputs a new time value to be associated with the parameter value in the plurality of parameter values.

18. The computer-readable medium of claim 10, where changing a time value in the second plurality of time values that is associated with a parameter value in the plurality of parameter values further comprises:

applying a distortion function to the time value, where the distortion function takes the time value and a distortion amount as inputs, and outputs a new time value to be associated with the parameter value in the plurality of parameter values.

19. A system comprising:

a display device; and one or more processors capable of interacting with the display device and performing operations comprising:

obtaining a composed paint stroke, the composed paint stroke having a stroke path and an appearance attribute, the stroke path being defined by a position-time association, the position-time association being an association between a plurality of position values and a first plurality of time values in a time period, the appearance attribute being defined by a parameter-time association, the parameter-time association being an association between a plurality of parameter values for the appearance attribute and a second plurality of time values in the time period, the second plurality of time values being variable independently of the first plurality of time values;

generating a first instance of the composed paint stroke based on the position-time association and the parameter-time association as obtained, where an instance of the composed paint stroke is defined as a plurality of composition time values, and a position value and a parameter value for each of the composition time values, and the position value and the parameter value for each of the composition time values are determined according to the position-time association and the parameter-time association of the composed paint stroke;

changing the composed paint stroke by changing a time value in the second plurality of time values that is associated with a parameter value in the plurality of parameter values such that the parameter-time association as changed differs from the parameter-time association as obtained;

generating a second instance of the composed paint stroke based on the position-time association as obtained and the parameter-time association as changed; and presenting the first instance and the second instance of the composed paint stroke on a display device in sequence such that the stroke path of the composed paint stroke remains stationary while the appearance attribute changes.

20. The system of claim 19, wherein the association of parameter values with time values is defined as a function.

21. The system of claim 20, wherein:
the function is piecewise linear.

22. The system of claim 20, wherein:
a different function is used for each parameter value.

23. The system of claim 20, wherein:
the function is implemented as a table.

24. The system of claim 19, wherein the operations further comprises:

interpolating between the first and second instances to generate one or more additional instances of the composed paint stroke; and presenting the one or more additional instances of the composed paint stroke on the display device in sequence between the first instance and the second instance of the composed paint stroke.

25. The system of claim 24, wherein:

the first instance and the second instance each corresponds to a keyframe of an animation, the animation having an animation time frame, each keyframe corresponding to a time point in animation time; and the time value is changed as a function of animation time.

26. The system of claim 25, where changing a time value in the second plurality of time values that is associated with a parameter value in the plurality of parameter values further comprises:

applying a distortion function to the time value, where the distortion function takes the time value and a distortion amount as inputs, and outputs a new time value to be associated with the parameter value in the plurality of parameter values.

27. The system of claim 19, where changing a time value in the second plurality of time values that is associated with a parameter value in the plurality of parameter values further comprises:

applying a distortion function to the time value, where the distortion function takes the time value and a distortion amount as inputs, and outputs a new time value to be associated with the parameter value in the plurality of parameter values.

* * * * *

UNITED STATES PATENT AND TRADEMARK OFFICE
CERTIFICATE OF CORRECTION

PATENT NO. : 7,656,406 B1  Page 1 of 1
APPLICATION NO. : 10/696740
DATED : February 2, 2010
INVENTOR(S) : Bartell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Thirtieth Day of November, 2010

David J. Kappos
*Director of the United States Patent and Trademark Office*